Oct. 9, 1945.     E. M. GILES     2,386,307
STOP NUT
Filed Sept. 9, 1943
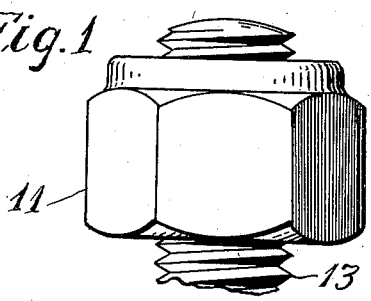
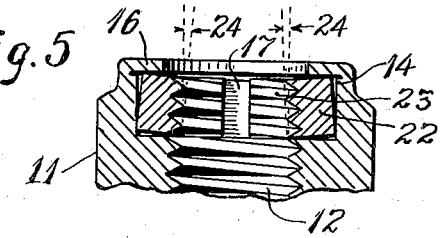
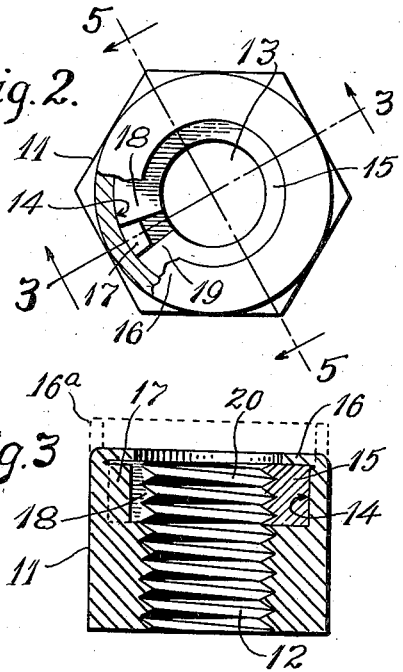
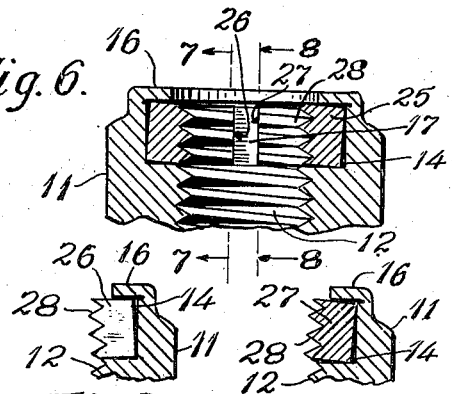
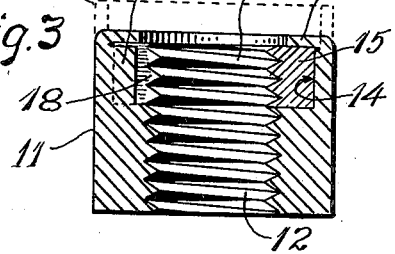
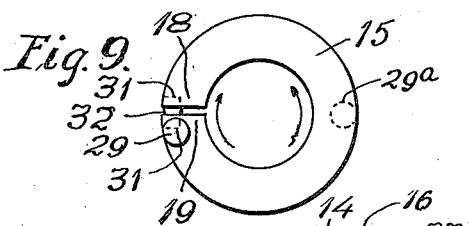
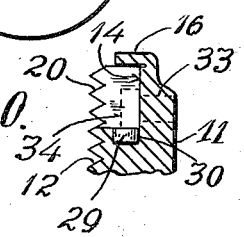
INVENTOR.
Eugene M. Giles Patented Oct. 9, 1945

2,386,307

UNITED STATES PATENT OFFICE 2,386,307

STOP NUT

Eugene M. Giles, Western Springs, Ill., assignor to William D. Kelly, Western Springs, Ill.

Application September 9, 1943, Serial No. 501,623

8 Claims. (Cl. 151—30)

My invention relates to nuts, or other internally threaded parts, which are adapted to have threaded engagement with another externally threaded part, such as a bolt, and has reference more particularly to facilities for insuring such frictional engagement of these threaded parts with one another that they remain securely engaged and immune to accidental displacement, even under the most severe conditions of actual use, and yet may be disengaged quite readily without injury to either part and may be reused indefinitely with the same assurance of immunity to accidental relative displacement.

To insure the desired immunity against accidental displacement requires a highly tenacious frictional engagement of the threads of one part with the threads of the other part, but it is essential, at the same time, that the frictional engagement be of such nature that the parts do not become frozen together or otherwise interlocked in any manner that will interfere with ready disengagement thereof from one another whenever required. It is also important that the disengagement shall not impair either of the parts for reuse and that the parts may be reused repeatedly with the same assurance of immunity to accidental displacement irrespective of wear of the threads that may occur upon repeated engagement and disengagement thereof. Moreover the frictional holding must be unaffected by oil, water, heat or other conditions to which such nuts are likely to be subjected.

Generally, nuts of the character involved herein must be made approximately the same size as the corresponding ordinary nut and capable of sustaining the same load, and there is accordingly only a very limited space in which frictional facilities may be accommodated for holding the nut against displacement or relative movement on the threaded stem.

Because of this space limitation, the making of a stop nut with frictional facilities of adequate tenacity and with the other essential or desired characteristics of immunity to oil, water, and heat, ready removability without impairment of either the nut or the threaded stem upon which it is used, and capability of repeated use with assurance of immunity against accidental displacement is a peculiarly and extraordinarily difficult problem.

The principal objects of my invention are, to provide an improved stop nut or the like which is frictionally engageable with a threaded stem with such a high degree of tenacity that immunity against accidental displacement is assured; to provide, within the limited space available, an unusually strong tension which is exerted to frictionally hold the nut in any position of adjustment on the threaded stem; to apply the tension in a manner to insure full surface contact with and maximum gripping effect on the frictionally engaged threads; and to incorporate these features in a simple form of lock nut or the like which may be readily manufactured at low cost; these and other objects being accomplished as pointed out hereinafter and as shown in the accompanying drawing in which:

Fig. 1 is a side view of a stop nut constructed in accordance with my invention and applied on a threaded stem;

Fig. 2 is a top view of the stop nut of Fig. 1 with a portion broken away to disclose details of the construction;

Fig. 3 is a sectional view of the stop nut taken on the line 3—3 of Fig. 2;

Fig. 4 is a top view of the split ring which is employed in the structure of Figs. 2 and 3 for frictionally holding the stop nut on the threaded stem;

Fig. 5 is a fragmentary sectional view somewhat similar to Fig. 3 showing a modified form of split ring;

Fig. 6 is a view similar to Fig. 5 showing another modified form of a split ring;

Figs. 7 and 8 are fragmentary sectional views taken on the lines 7—7 and 8—8 respectively of Fig. 6 showing comparatively the angular disposition of the opposed ends of the split ring of Fig. 6;

Fig. 9 is a bottom view of a split ring showing a stud with which the ring may be provided for holding the ring against relative turning movement in the nut cavity; and Fig. 10 is a fragmentary sectional view of the upper portion of a nut showing the engagement of the stud of Fig. 9 with the nut body.

One the drawing the reference numeral 11 indicates the body of the nut which is of conventional hexagonal form with an opening therethrough internally threaded as at 12 to engage a threaded stem 13, such as the threaded end of a bolt. It is to be understood, however, that the holding facilitities of this invention are not limited to the particular form of nut illustrated but may be incorporated in nuts of other forms or in any part which is internally threaded to receive a threaded stem and may be used in connection with any threaded stem whether a bolt or otherwise.

At the outer end of the threaded opening 12, the nut body 11 is provided with a circular cavity 14 to accommodate the gripping member 15 which is in the form of a split ring, and is held in the circular cavity 14 by the turned over flange 16 of the nut body 11. The circular cavity 14 is provided at one side thereof with a key like formation or lug 17 which is interposed between the separated ends 18 and 19 of the split ring and this split ring is provided with internal threads 20 which form a continuation of the internal threads 12 of the nut body.

This gripping member 15 serves to frictionally hold the nut 11 in any position of adjustment thereof on the threaded stem 13 and is accordingly arranged to engage the threaded stem 13 with such a tight frictional fit that accidental displacement of the nut from any position of adjustment thereof on the stem 13 is precluded.

To this end the split ring 15 is made of a springy material of considerable stiffness and in a form in which the ends 18 and 19 thereof are normally closer together than when installed in the nut 11 so that when so installed, these ends 18 and 19 are separated by the key or lug 17 under a substantial tension which tends to contract the split ring. Moreover, the internal opening of the split ring 15 and threading 20 thereof is such that when the ends 18 and 19 abut against the key or lug 17, the threaded opening of the split ring is slightly smaller than the threaded opening 12 of the nut 11 so that when the stem 13 is engaged with the nut 11 and the split ring 15 thereof, the split ring is thereby expanded and the ends 18 and 19 separated a slightly greater distance than when normally engaged against the key or lug 17 so that the entire contracting tension of the expanded split ring 15 is exerted to produce frictional engagement of the internal threads 20 of the split ring with the external threads of the threaded stem 13.

It will be understood, of course, that the circular cavity 14 of the nut body 11 is of a diameter slightly greater than the diameter of the split ring in the normal condition of the latter in the nut, so as to permit the required expansion of the split ring when the nut is applied on the stem 13, and that the split ring is held in the cavity by the inturned flange 16 without any pressure that would interfere with the freedom of expansion and contraction of the split ring 15, and it will be further understood that the split ring as installed in the nut has the ends 18 and 19 separated by the key or lug 17 under a substantial contracting tension.

Thus the split ring 15 as installed in the nut, is under a constant predetermined initial tension which, upon application of the nut to the threaded stem 13, becomes effective to cause a very substantial frictional gripping which is exerted radially upon the stem, and by reason of this radial application of this accumulated tension the threads 20 of the split ring engage throughout substantially their entire surface area with the corresponding thread surfaces of the stem 13 and thereby insure maximum contact with maximum frictional resistance against turning movement of the nut on the stem.

The nut body 11 may be made in any conventional manner with the cavity 14 and key or lug 17 to accommodate the gripping member 15 and it is preferred to form this nut body with an integral upstanding flange, indicated by dotted lines at 16ᵃ in Fig. 3, which is subsequently turned in over the gripping member 15 to hold the latter in place.

The gripping member 15 may be made in any convenient manner, as for example by stamping same from a sheet of material of a thickness corresponding to the thickness (crosswise of the threads) of the split ring or it may be rolled from a short length of stock of suitable width and thickness, into the ring form, and this ring is provided with a split at one side, such as indicated at 21 in Fig. 4, so that it may be expanded as indicated by the dotted lines in Fig. 4, to provide the desired tension when the ends 18 and 19 are separated and engaged with the key or lug 17 in the cavity 14 of the nut.

It will be understood, of course, that in the normal relaxed condition of the ring 15 the split 21 may be closed as shown in Fig. 4 or the ends 18 and 19 may be separated to some extent, depending on the stiffness of the stock of which the split ring is formed and the degree of tension desired when the ends 18 and 19 are separated sufficiently to accommodate the key or lug 17 therebetween, and it will be understood further that the ring should be formed so that in the expanded form which it assumes upon engagement with the threaded stem 13 the internally threaded opening thereof is then of truly circular form so that the internal threads thereof match perfectly and have intimate contact throughout their surfaces with the external threads of the threaded stem 13 to insure maximum frictional gripping effect on the threads of the stem.

The nut body and also the split ring 15 may be internally threaded before assembly thereof, care being taken so that when assembled the internal threads 20 of the split ring will be in proper continuation relation with the threads 12 of the nut body, but it is preferred to internally thread the nut body and split ring simultaneously in the same operation, after the split ring is assembled in the cavity 14, so as to insure a perfect continuation of the threading from the threads 12 of the nut body to the threads 20 of the split ring.

In this threading operation the ends 18 and 19 are held away from the respective opposite side surfaces of the key or lug 17 in any convenient manner, as for example by thin shims interposed therebetween or by a wedge member or spreader inserted between the split ring ends 18 and 19 or by separable jaws which are engaged with the separable ends 18 and 19 or in any other convenient manner, and the ring 15, as thus expanded, is clamped tightly against the bottom of the cavity 14 whereupon a threading tap is applied through the nut body and split ring to form the internal threads 12 and 20 thereof which are thus in perfect alignment with the threads 20 of the split ring constituting a perfect continuation of the threads 12 of the nut body.

After this threading operation is completed, the shims, wedge, separable jaws or other facilities by which the ends 18 and 19 are separated from the key or lug 17 during the threading operation, are removed, as well as the facilities by which the split ring is clamped against the bottom of the cavity 14 and the flange 16ᵃ (see Fig. 3) is then turned down over the split ring 15 to hold the latter in place in the cavity 14, care being taken to avoid any clamping action of the flange 16 against the split ring that would interfere with the freedom of expansion and contraction of the split ring 15.

This freedom may be assured by inserting a threaded tool through the threaded opening 12 of the nut body into engagement with the threaded interior of the ring 15 and, by means of this tool, holding the split ring 15 slightly away from the bottom of the cavity 14 while the flange 16ᵃ is turned down against the outer face of the split ring so that when the tool is removed there is sufficient clearance between the split ring and the overlying flange 16 and between the split ring and the bottom of the cavity 14 to insure complete freedom of expansion and contraction of the split ring 15.

It will be understood that the extent of separation of the ends 18 and 19 from the respective side faces of the key or lug 17 for the threading operation is only very slight and merely sufficient to insure that when a threaded stem 13 is engaged with the threads 20, the ends 18 and 19 of the split ring are freed from the key or lug 17 so that the tension of the expanded split ring 15 is then exerted entirely on the stem. To insure certain and continued gripping under all conditions, allowance should be made for wear and for any variations in size of threaded stems 13 upon which the nut may be used and accordingly in the threading operation the ends 18 and 19 should be separated sufficiently from the key or lug 17 so that said ends 18 and 19 will be freed by the entering stem 13 from the key or lug 17 even if there are slight variations in the sizes of the stem 13 and notwithstanding wear of the threads that may occur through repeated applications and removals of the nut to and from the threaded stem 13.

Instead of making the gripping ring of the cylindrical form shown in Figs. 2, 3 and 4, it may be of a conical or tapered form as shown at 22 in Fig. 5, tipped inwardly from the bottom to the top entirely therearound at a suitable inclination as shown so that the internal threaded opening 23 thereof is tapered substantially as indicated at 24. Thus the stem 13, upon entering the split ring through the nut body imposes a wedging action on the ring 22 to cause it to assume a cylindrical form, and thereby a high tension is created in the ring 22 which causes the ring to tightly grip the threads of the stem.

This tapered split ring 22 is held against turning movement in the cavity 14 by the key or lug 17 which is interposed between the ends of the split ring 22 and the lower entering end of the ring opening 23 is preferably of slightly smaller diameter than the threaded opening 12 of the nut body so that slight expansion of the split ring 22 occurs as the end of the threaded stem 13 enters the threaded opening 23 and progressively increased expansion thereof occurs as the end of threaded stem 12 advances through the ring 22.

This split ring is not necessarily externally tapered as shown but may be otherwise formed externally so long as the internal threaded opening 23 is tapered and the ring has sufficient freedom in the cavity 14 to assume the shape which it is caused to assume when engaged on the stem 13.

Moreover, the split ring 22 may be formed normally with the ends separated sufficiently to accommodate the key or lug 17 therebetween so that it is under no initial tension when installed, in which event the gripping action on the stem 13 is due entirely to the tension created by the spreading of the split ring that is caused by the stem 13. It is preferred, however, that the split ring 22 have some initial tension when installed and to this end it is preferably, like the split ring of Figs. 2, 3 and 4, of a normally smaller diameter so that the ends are separated under a tension when the ring is installed in the cavity 14 with the key or lug 17 interposed between the ends. Thus the gripping action which occurs as a result of the twisting of the ring 22 from the tipped or tapered form to the untapered form which it is caused to assume by the engagement of the stem 13 therewith is greatly enhanced by the accumulated tension already present in the split ring on account of the forcible separation of the ends of the split ring to accommodate the key or lug 17 therebetween.

In either event, the wedging action of the stem 13, in the tapered opening 23 of the split ring 22, twists the ring and removes the taper from the opening 23 so that the internal threads 23 thereof fit snugly against the external threads of the stem 13 with a frictional tenacity that holds the nut securely against accidental displacement in any position of adjustment on the stem.

Instead of making the split ring in the tapered form shown in Fig. 5, a split ring 25 such as shown in Figs. 6, 7 and 8 may be employed which is twisted from end to end, the separated ends 26 and 27 thereof being oppositely tipped with the end 26 thereof at the one side of the key or lug 17 being tipped inwardly from the bottom to the top as indicated in Fig. 7 and the other end 27 thereof at the opposite side of said key or lug 17 being tipped inwardly from top to bottom as indicated in Fig. 8 so that when the threaded stem 13 enters this twisted split ring 25 the end 26 thereof is deflected outwardly at the top and the end 27 is deflected outwardly at the bottom and the twist eliminated throughout the circumferential length of the split ring so that the internal threads 28 hereof fit snugly against the external threads of the stem with a high frictional tenacity.

This split ring 25, like the split ring 22 of Fig. 5, may be formed normally with the ends separated sufficiently to accommodate the key or lug 17 therebetween or it may, like the split ring of Figs. 2, 3 and 4, be of a normally smaller diameter so that the ends are separated under a tension when the ring is installed in the cavity 14 with the key or lug 17 interposed between the ends 26 and 27.

For holding the gripping rings hereof against turning movement in the cavity 14 of the nut body, the key or lug 17 may be omitted and a projection or stud 29 provided on the bottom of the split ring to fit in a seat 30 in the bottom face of the cavity 14 as shown in Fig. 10. This stud may be located near one end of the split ring as shown by full lines in Fig. 10, preferably at the proper end to provide a wrapping action of the griping member on the stem 13 in unscrewing the nut from the stem, or it may be located elsewhere as for example centrally of the circumferential length of the split ring as indicated by the dotted lines at 29ª in Fig. 9 so that a wrapping action occurs in screwing the nut on the stem as well as in unscrewing the nut from the stem.

Obviously if means such as the stud of Figs. 9 and 10 is employed for holding the gripping ring against turning movement in the cavity 14 instead of the key or lug 17, the gripping ring must be made normally of the diameter required in the cavity of the nut or if it is made normally of smaller diameter, as in the construction shown in Fig. 4, some form of spacer will be required between the separated ends of the split ring to hold the latter expanded to the diameter required in the cavity of the nut.

For this purpose the opposed ends of the split ring may be provided with matching seats, indicated by dotted lines at 31 in Fig. 9, to receive the opposite ends of a spreader 32 which holds the ends of the split ring in any desired separated relation to provide the split ring with initial tension when installed in the nut cavity and it will be understood, of course, that when the assembled split ring and spreader 32 are installed in the nut cavity the spreader 32 is locked in the seats 31 so that it cannot be displaced therefrom.

Moreover, instead of employing a nut body with the integral key 17, a separate key may be provided which is attached to the nut body and projects between the separated ends of the split ring. For example, a radial opening may be provided in the annular wall of the cavity 14 as indicated by dotted lines at 33 and a headed pin inserted in this opening from the cavity 14 so that the pin head, indicated by dotted lines at 34 is located between the separated ends of the split ring. In such case it is preferable to form the opposed ends of the split ring with seats to accommodate opposite side margins of the head 34 so that the pin is locked against displacement from the opening 33 when the split ring is installed in the nut cavity and these seats should open through the bottom of the ring so that in assembling the nut the headed pin may be inserted in the opening 33 and the split ring thereafter slipped downwardly into the cavity 14 to engage the head 34 of the pin and lock the latter in place.

While I have shown and described my invention in the preferred form, I am aware that various changes therein can be made without departing from the spirit of my invention, the scope of which is to be determined by the appended claims.

What is claimed is:

1. A nut assembly or the like of the class described having an opening therethrough internally threaded to screw on a threaded stem, said internal threading including a non-displaceable portion and an adjoining displaceable portion which is relatively non-rotatable and forms a continuation of the non-displaceable portion, said non-rotatable portion comprising an internally threaded split ring twistable in planes transverse to its circumferential length and having portions of the internal threaded area thereof disposed angularly to the axis of the opening and said split ring being twistably displaceable to dispose said angularly disposed portions of the threaded area in parallelism with said axis by a threaded stem engaged through said opening.

2. In a nut or the like of the class described, the combination of a nut body having an opening which is internally threaded, said nut body having a cavity at one end of said opening with keying means at one side thereof, an annular springy gripping member mounted in said cavity and comprising a split ring having internal threading constituting a continuation of the internal threads of the nut body, said split ring having the ends separated under tension with the said keying means interposed therebetween.

3. In a nut or the like of the class described, the combination of a nut body having an opening which is internally threaded, said nut body having a cavity at one end of said opening with keying means at one side thereof, an annular springy gripping member mounted in said cavity and comprising a split ring having internal threading constituting a continuation of the internal threads of the nut body, said split ring having the ends separated under tension with the said keying means interposed therebetween and said split ring having the internally threaded opening thereof tapered.

4. In a nut or the like of the class described, the combination of a nut body having an opening which is internally threaded, said nut body having a cavity at one end of said opening with keying means at one side thereof, an annular springy gripping member mounted in said cavity and comprising a split ring having internal threading constituting a continuation of the internal threads of the nut body, said split ring having the ends separated under tension with the said keying means interposed therebetween, said split ring being twisted circumferentially from the end thereof at one side of the keying means to the end thereof at the other side of the keying means.

5. A nut or the like of the class described comprising a body with a threaded opening, said body having at one end of its said threaded opening, relatively non-rotatable annular springy gripping means with a threaded opening smaller than and affording a continuation of the threaded opening of the body, said annular gripping means being split and separated circumferentially at the split under a contracting tension which is increased by expansion of its threaded opening to the size of the threaded opening of the body.

6. A nut or the like of the class described comprising a body with a threaded opening, said body having at one end of its said threaded opening, relatively non-rotatable annular springy gripping means with a threaded opening smaller than and affording a continuation of the threaded opening of the body, said annular gripping means being split and resistively expansible radially to the body opening size and means interposed between and maintaining the portions of the annular gripping means at the opposite sides of the slit in separated relation.

7. A nut or the like of the class described comprising a body with a threaded opening, said body having at one end of its said threaded opening, relatively non-rotatable annular springy gripping means with a threaded opening smaller than and affording a continuation of the threaded opening of the body, said annular gripping means being split and resistively expansible radially to the body opening size and means interposed between the portions of the annular gripping means at the opposite sides of the slit and preventing rotation of the annular gripping means relative to the body.

8. A nut or the like of the class described comprising a body provided with a threaded opening and having a circular cavity at one end of the threaded opening, a circular split ring in the cavity having a threaded opening smaller than and affording a continuation of the threaded opening of the body, said split ring being resistively expansible radially to the body opening size and held against relative rotation in the cavity, and means holding the ends of the split ring in separated relation under a contracting tension which is increased by expansion of its threaded opening to the size of the threaded opening of the body.

EUGENE M. GILES.